United States Patent

Wilstermann et al.

Patent Number: 6,145,491
Date of Patent: Nov. 14, 2000

[54] METHOD FOR DETECTING COMBUSTION KNOCK FROM THE IONIC CURRENT IN AN INTERNAL COMBUSTION ENGINE

[75] Inventors: Hartung Wilstermann, Gaildorf; Peter Hohner, Echterdingen; Peter Bertelshofer, Zirndorf, all of Germany

[73] Assignees: Temic Telefunken microelectronic GmbH, Heilbronn; DaimlerChrysler AG, Stuttgart, both of Germany

[21] Appl. No.: 09/211,458

[22] Filed: Dec. 14, 1998

[30] Foreign Application Priority Data

Dec. 12, 1997 [DE] Germany .............................. 197 55 255

[51] Int. Cl.⁷ .............................. F02P 5/152; G01L 23/22
[52] U.S. Cl. ................................ 123/406.35; 123/406.37; 73/35.04
[58] Field of Search ........................ 123/406.34, 406.35, 123/406.36, 406.37; 701/11; 73/35.03, 35.04, 35.05, 35.08

[56] References Cited

U.S. PATENT DOCUMENTS

| | | | |
|---|---|---|---|
| 4,337,642 | 7/1982 | Yoshida et al. | 73/35.09 |
| 4,478,068 | 10/1984 | Bonitz et al. | 73/35.04 |
| 4,565,087 | 1/1986 | Damson et al. | |
| 4,716,874 | 1/1988 | Hilliard et al. | |
| 5,040,510 | 8/1991 | Krebs et al. | |
| 5,220,821 | 6/1993 | Moser et al. | |
| 5,263,452 | 11/1998 | Ohsawa et al. | 123/406.37 |
| 5,305,722 | 4/1994 | Fukui | 123/406.37 |
| 5,836,285 | 11/1998 | Aoki et al. | 123/406.37 |

FOREIGN PATENT DOCUMENTS

| | | |
|---|---|---|
| 0399068 | 11/1990 | European Pat. Off. . |
| 3027103 | 1/1981 | Germany . |
| 3128027 | 2/1983 | Germany . |
| 3137016 | 3/1983 | Germany . |
| 3319458 | 11/1984 | Germany . |
| 3415948 | 10/1985 | Germany . |
| 4239592 | 5/1993 | Germany . |
| 4321782 | 1/1994 | Germany . |
| 196 18 980 | 11/1996 | Germany . |
| 2259365 | 3/1993 | United Kingdom . |
| WO89 11087 | 11/1989 | WIPO . |

*Primary Examiner*—Andrew M. Dolinar
*Attorney, Agent, or Firm*—W. F. Fasse; W. G. Fasse

[57] ABSTRACT

A method of recognizing knocking combustion in an internal combustion engine involves sensing an ionic current in the combustion chamber and providing a corresponding ionic current signal, detecting the signal during a pertinent time window and band-pass filtering the signal for a pertinent frequency range characteristic of knocking phenomena, integrating the signal to provide a present integral value, and then comparing the present integral value to a lower knocking threshold and a higher knocking threshold. If the present integral value exceeds the lower knocking threshold but does not exceed the higher knocking threshold, the combustion is identified as a knocking combustion. If the present integral value exceeds the higher knocking threshold, the value is essentially disregarded as being implausible, and the combustion is identified either as non-knocking, or as the same combustion condition, i.e. either knocking or non-knocking, that had been determined in the previous combustion cycle. The knocking thresholds are updated to follow variations in the integral values that do not exceed the existing lower knocking threshold. Especially the higher knocking threshold is adjusted dependent on the present operating condition of the engine, as represented by a plurality of respectively differently weighted prior integral values. Whenever a knocking combustion is recognized, the higher knocking threshold is maintained at the previously determined value.

16 Claims, 3 Drawing Sheets

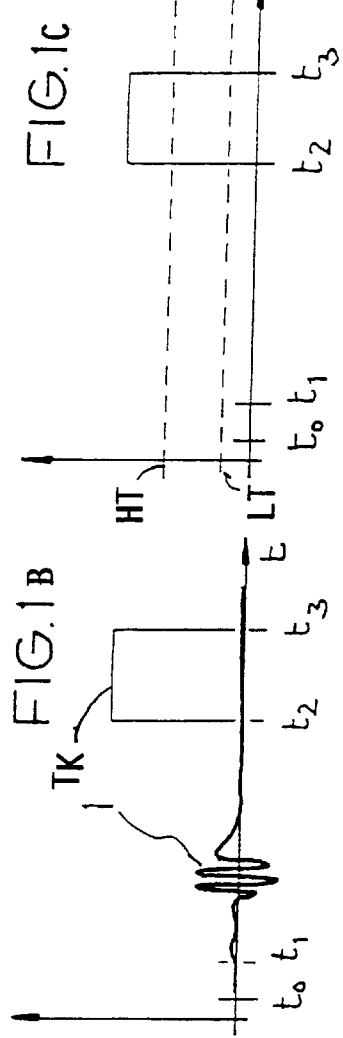
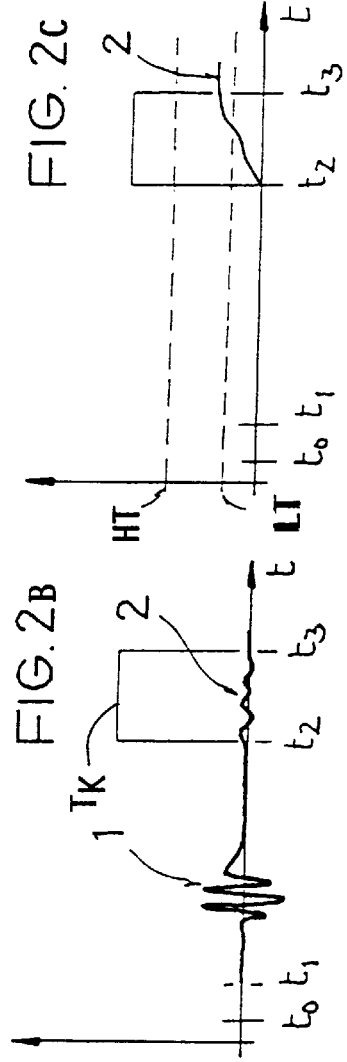
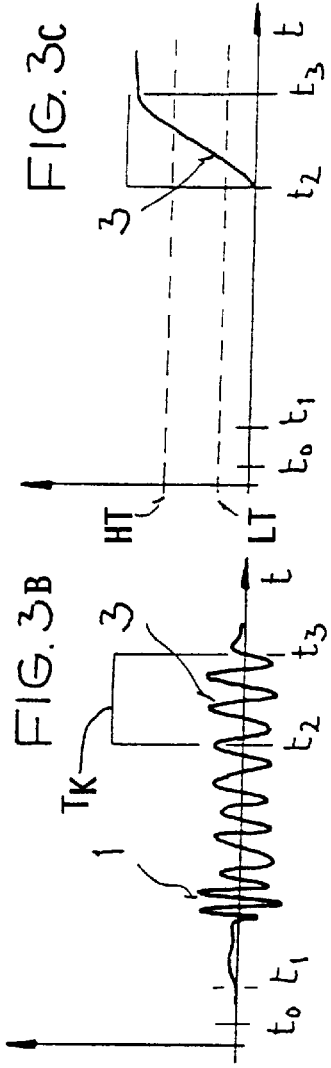

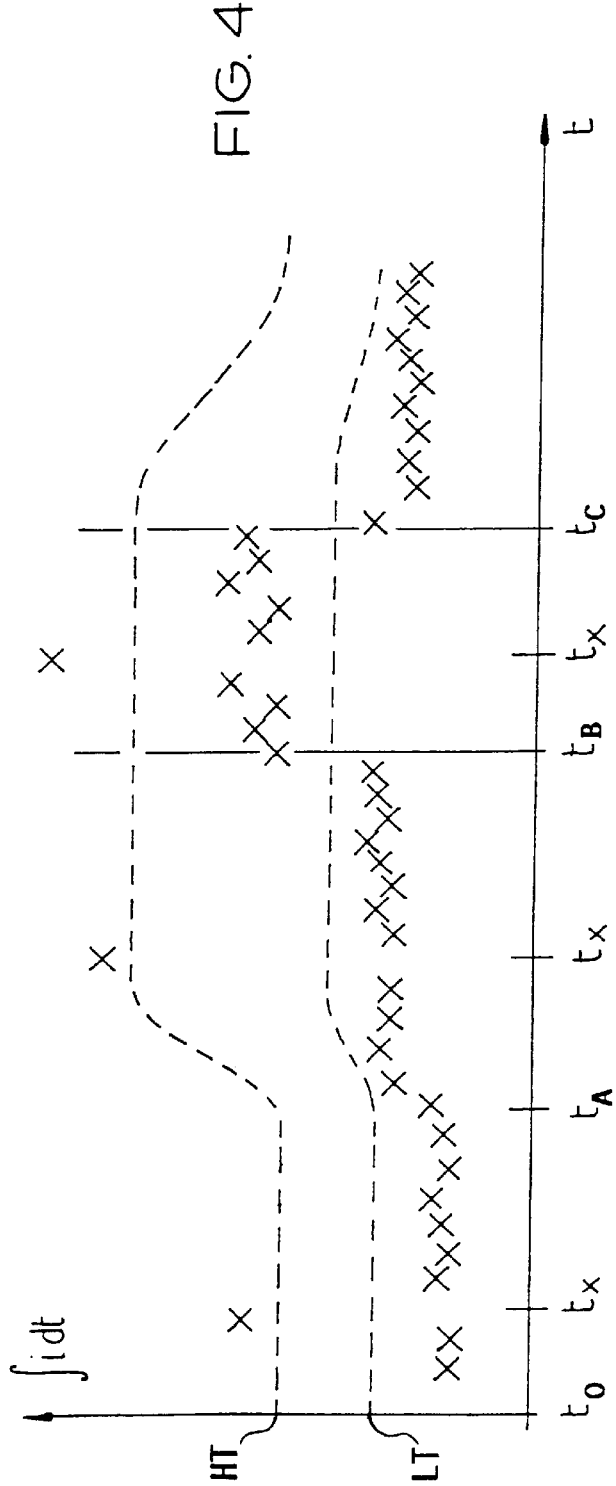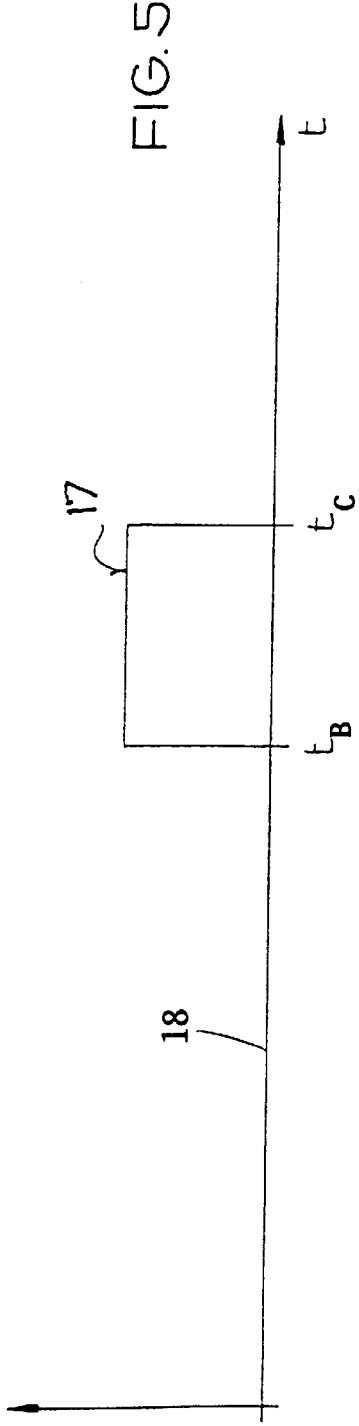

METHOD FOR DETECTING COMBUSTION KNOCK FROM THE IONIC CURRENT IN AN INTERNAL COMBUSTION ENGINE

CROSS-REFERENCE TO RELATED APPLICATION

This application is related to the copending application of common inventors Hartung Wilstermann, Peter Hohner, and Peter Bertelshofer, as well as further inventor Jürgen Schenck entitled "METHOD AND APPARATUS FOR DETECTING COMBUSTION KNOCK FROM THE IONIC CURRENT IN AN INTERNAL COMBUSTION ENGINE", filed on Dec. 14, 1998, under U.S. application Ser. No. 09/211,460. The entire disclosure of the related application is incorporated herein by reference.

PRIORITY CLAIM

This application is based on and claims the priority under 35 U.S.C. §119 of German Patent Application 197 55 255.2, filed on Dec. 12, 1997, the entire disclosure of which is incorporated herein by reference.

FIELD OF THE INVENTION

The invention relates to a method for detecting knocking during combustion in an internal combustion engine by evaluating an ionic current signal sensed in the combustion chamber.

BACKGROUND INFORMATION

In the normal combustion of a fuel-air mixture in an internal combustion engine, the fuel-air mixture is ignited by an ignition spark and then burns in a controlled and progressive manner as the flame front advances through the compressed fuel-air mixture in the cylinder chamber. However, an undesired auto-ignition and uncontrolled explosion of the as-yet un-burned fuel-air mixture, commonly known as "knocking", "pinging", or "detonation", can also occur. Such knocking is generally to be avoided because it causes intense pressure waves oscillating in the cylinder, which cause a vibration of the engine components and a resultant audible knocking noise. Ultimately, the intense knocking forces can damage or destroy the engine. Nonetheless, under at least some operating conditions, an engine can achieve its maximum power output and efficiency by operating directly at the limit or boundary of knocking conditions. Thus, an engine controller, such as the conventionally known electronic control unit (ECU), aims to operate the engine as close as possible to the knocking limit without actually causing knocking. If knocking does occur, then corrective measures are taken, for example the ignition timing is slowly retarded, i.e. adjusted in a direction toward the top dead-center position of the piston.

Knocking combustion is generally characterized by pressure oscillations having a frequency in the range from 5 to 20 kHz, taking place in a time interval following the maximum cylinder pressure, i.e. maximum compression. The knocking combustion can be detected by measuring and evaluating changes in the ionic current that flows within the cylinder combustion chamber. This ionic current can be sensed by a suitable sensor arranged in the cylinder, for example a spark plug may be used as an ionic current sensor. However, the ionic current signal already exhibits a first maximum signal level as well as oscillations of the ionic current at the time when the flame front advances and spreads through the fuel-air mixture in the cylinder. This maximum signal level and oscillations in the ionic current can be mis-evaluated to result in an erroneous detection of knocking when knocking has not actually occurred, because these signal oscillations are caused by turbulence in the cylinder and not by knocking.

Methods are known in the art for trying to detect the occurrence of knocking combustion by analyzing the ionic current signal. However, such known methods have been found to be especially disadvantageous and ineffective, particularly when atypical operating conditions of the engine arise, or whenever such methods are to be used in specialized engines, for example engines using a multiple spark ignition during a single combustion cycle. In these situations, the known knock detection methods often give erroneous results. Erroneous results, and especially false detections of knocking, can also arise when the ignition timing is adjusted, for example in order to avoid knocking.

More specifically, the prior art methods in this context involve comparing the signal level of the ionic current signal to a single minimum knocking threshold. Namely, if the signal level of the ionic current signal exceeds the minimum knocking threshold, then the prior art methods indicate that knocking combustion is taking place. However, such methods fail to take into account certain characteristics of the knocking phenomenon. First, the time portion of the ionic current signal that is significant for recognition of the knocking combustion is relatively brief, and therefore a failure to properly limit the sampling or evaluation of the signal to a pertinent time window leads to erroneous knock recognition. Secondly, and simultaneously, very strong oscillations of the ionic current signal can be caused, for example especially by the flame front expanding through the fuel-air mixture during the normal or proper combustion process. Since these strong oscillations are not caused by knocking but rather by normal combustion influences, the prior art methods that fail to distinguish between these oscillations and the signal variations stemming from knocking are prone to erroneous knock recognition. Namely, this characteristic oscillation of the ionic current signal will often result in a signal level that exceeds the minimum knocking threshold, and is therefore falsely recognized as a knocking phenomenon.

For the above reasons, in all of the above mentioned cases, the known methods can result in the detection of at least a portion of the expanding flame front in the measuring time window during which the ionic current signal is measured or evaluated. Since the flame front causes a strong variation in the ionic current signal, the result is an erroneous detection of knocking combustion. Accordingly, any combustion process in which the expanding flame front influences the ionic current sensor during the sampling and evaluation time window will be recognized as a knocking combustion, and an anti-knock control will be activated as is known from German Patent 4,239,592, for example. The anti-knock control will responsively shift the ignition timing back toward top dead-center, and as a result, during subsequent combustion cycles the flame front will expand even more strongly into the measuring time window during which the ionic current is sampled and evaluated. This will result in the detection of an even more strongly varied ionic current signal, which will accordingly be recognized as an even worse knocking condition, whereupon the anti-knock control will be actuated to retard the ignition timing point even further. This chain of events leads to a complete breakdown or failure reaction of the ignition timing control due to the initial erroneous recognition of knocking combustion when knocking was not actually occurring.

SUMMARY OF THE INVENTION

In view of the above it is an object of the invention to provide a method for recognizing knocking combustion by evaluating the ionic current signal in an internal combustion engine, which is technically easy to realize and which is resistant to interference, erroneous knock recognition, and faulty run-away operation that may be caused by the above described effects that have an influence on prior art methods. The invention is to be especially applicable for actuating the automatic ignition timing control of an engine, and especially an engine using a multi-spark ignition. The present invention further aims to avoid or overcome the other disadvantages of the prior art, and to achieve additional advantages, as apparent from the present description.

The above objects have been achieved according to the invention in a method of recognizing knocking combustion in an internal combustion engine in which a fuel-air mixture is ignited by means of an ignition spark at an ignition time. According to the invention, the ionic current is sensed or detected in the combustion chamber to provide a corresponding ionic current signal. Then this signal is detected or sampled during a specified time window and filtered in a band-pass filter to isolate the time and frequency components relevant for knock recognition (whereby the relative order of carrying out the time sampling and the frequency filtering is not critical). The filtered and sampled signal is then integrated to provide a present integral value, which is compared to a lower or minimum knocking threshold and to a higher or maximum knocking threshold, whereby the higher threshold has a higher value than the lower threshold.

As a first case, if the present integral value does not exceed the lower knocking threshold, then a non-knocking signal is provided indicating that knocking has not been detected and that the combustion is considered to be normal. As a second case, if the present integral value exceeds the lower knocking threshold and does not exceed the higher knocking threshold, then a knock recognition signal is provided, indicating that knocking has been detected. In this context it should be understood that either or both of the non-knocking signal and the knock recognition signal may be a positively released signal, such as a logic 1 or high signal, or some other specified signal, or may simply be the lack of the other signal. In the most basic embodiment, the knock recognition signal is a logic 1 or high signal, while the non-knocking signal is a logic 0 or low signal, i.e. the lack of the high signal. Also, the method operates substantially equivalently if the comparisons are carried out on the basis of the integral value being "equal to or exceeding" rather than strictly "exceeding" the respective threshold.

As a third case, if the present integral value exceeds the higher knocking threshold, then either the non-knocking signal is provided, or the same non-knocking or knock recognition signal that was provided in the preceding cycle is maintained. In other words, in this case the combustion is recognized and indicated either as:
a) normal non-knocking combustion regardless of the determination during the preceding cycle; or
b) the same combustion, i.e. either knocking combustion or normal non-knocking combustion, as was determined in the preceding evaluated combustion cycle.

The use of two different knocking thresholds, forming three different integral value ranges according to the invention takes advantage of the fact that the characteristic ionic current signal associated with a flame front has a significantly higher amplitude than the ionic current signal associated with a knocking phenomenon, even in the frequency range significant to the knocking. Thus, by comparing the obtained integral value of the ionic current signal to a higher or maximum knocking threshold, it is possible to carry out a plausibility test of this integral value. Consequently, integral values that lie above the higher knocking threshold are judged to be implausible and are thus effectively rejected or ignored, so that the combustion will be defined as being normal non-knocking combustion or will be defined as unchanged relative to the previously determined combustion condition. This determination based on the comparison with the upper knocking threshold thus overrides the determination based on the comparison with the lower knocking threshold, because any integral value that exceeds the upper knocking threshold will of course also exceed the lower knocking threshold.

The two alternative results regarding the final definition of the present combustion condition, in the above defined third case in which the present integral value is rejected as implausible, make it possible to adapt the method to provide an appropriate output signal to be used as an input for various different engine control or regulation loops that will responsively carry out corrective control measures, such as adjusting the engine's ignition timing or the like. For example, the differences become clear in a situation in which the higher knocking threshold is exceeded during the occurrence of knocking. Namely, in methods and/or control devices that carry out a very rapid and strong adjustment of the ignition timing, it can be advantageous to maintain the previously determined indication of the combustion condition (i.e. to continue providing the knocking recognition signal), instead of immediately providing the new indication of non-knocking combustion, so as to avoid a premature erroneous readjustment of the ignition timing point. On the other hand, in methods and/or control devices that carry out the adjustment of the ignition timing in relatively small incremental steps, it is generally possible to achieve proper error-free operation even when immediately providing the new indication of non-knocking combustion. The proper alternative output must respectively be tested or otherwise determined for each individual application, so that the final output provided according to the present method is properly adapted to be used as an input to the particular control arrangement that will adjust the ignition timing.

Further according to the invention, it is very advantageous for the higher knocking threshold to be adjusted or updated cycle-by-cycle dependent on and following a parameter that describes the presently existing operating condition of the engine. This is especially true since the ionic current signal may vary rather strongly dependent on the respective prevailing operating condition of the engine, for example particularly the rotational speed and the load applied to the engine. Thus, by continuously updating the higher knocking threshold dependent on the operating parameter such as the rotational speed or the load, it is possible to remove any influence that the particular operating condition might have on the present evaluation method.

As a further feature according to the invention, it is especially advantageous to adjust or update at least the higher knocking threshold dependent on at least one and preferably a plurality of prior integral values of the ionic current signal. In this context, the prior integral values can be respectively weighted by respective weighting factors that decrease with increasing time of the prior values before the present integral value. In this manner, relatively slow variations, i.e. variations having a long time constant, in the ionic current signal can be taken into account very effectively. In this context, the higher knocking threshold may be determined from an approximation or a digital low-pass filtering of the preceding integral values.

A further advantageous feature of the invention involves maintaining the higher knocking threshold at the same value as in the last evaluation cycle, i.e. not updating the higher knocking threshold value, as long as a knocking combustion is being detected. This prevents a situation in which integral values of the ionic current signal associated with a knocking combustion condition are taken into account in the weighting function for determining the new updated higher knocking threshold value. It is desirable to avoid such a situation, because if the higher knocking threshold value is updated in consideration of the increased integral values associated with knocking combustion, it can occur that the higher knocking threshold is pushed up to such a high value that even non-knocking disturbances of the flame front signal that were previously clearly recognized as lying above the knocking range will be erroneously indicated as being knocking phenomenon. Thus, whenever knocking is detected, the integral values associated with the knocking will not be used in the weighting function, but rather the weighting will be carried out based on the previous acceptable integral values that were not associated with knocking.

It is particularly preferred to couple or link the higher knocking threshold to the lower knocking threshold by a fixed multiplicative factor f greater than 1, insofar as the lower knocking threshold is directly updated to follow and be dependent on the above mentioned operating condition of the engine or prior weighted integral values. By coupling the upper knocking threshold to the lower knocking threshold in this manner, a duplicative recalculation of equivalent variations can be avoided, and the computational burden exerted on the control unit is reduced. Each time the lower knocking threshold is recalculated, it is simply necessary to multiply or amplify the new lower knocking threshold value by the factor f to determine the new higher knocking threshold value.

BRIEF DESCRIPTION OF THE DRAWINGS

In order that the invention may be clearly understood it will now be described in connection with example embodiments, with reference to the accompanying drawings, wherein:

FIGS. 1A, 1B and 1C respectively schematically show the ionic current signal, the band-pass filtered signal, and the integral of the band-pass filtered signal over a significant time interval, as a function of time during a single combustion cycle exhibiting normal combustion without knocking;

FIGS. 2A, 2B and 2C respectively schematically show the ionic current signal, the band-pass filtered signal, and the integral of the band-pass filtered signal over a significant time interval, as a function of time during a single combustion cycle exhibiting knocking;

FIGS. 3A, 3B and 3C respectively schematically show the ionic current signal, the band-pass filtered signal, and the integral of the band-pass filtered signal over a significant time interval, as a function of time during a single combustion cycle exhibiting an atypical combustion phenomenon;

FIG. 4 is a schematic diagram representing the adaptation or up-dating of the threshold values dependent on the operating condition of the engine, while maintaining the prior threshold values in the case of knocking combustion, as a function of time; and FIG. 5 is a schematic time diagram of a knock recognition output signal indicating the occurrence of knocking combustion.

Figure 6:
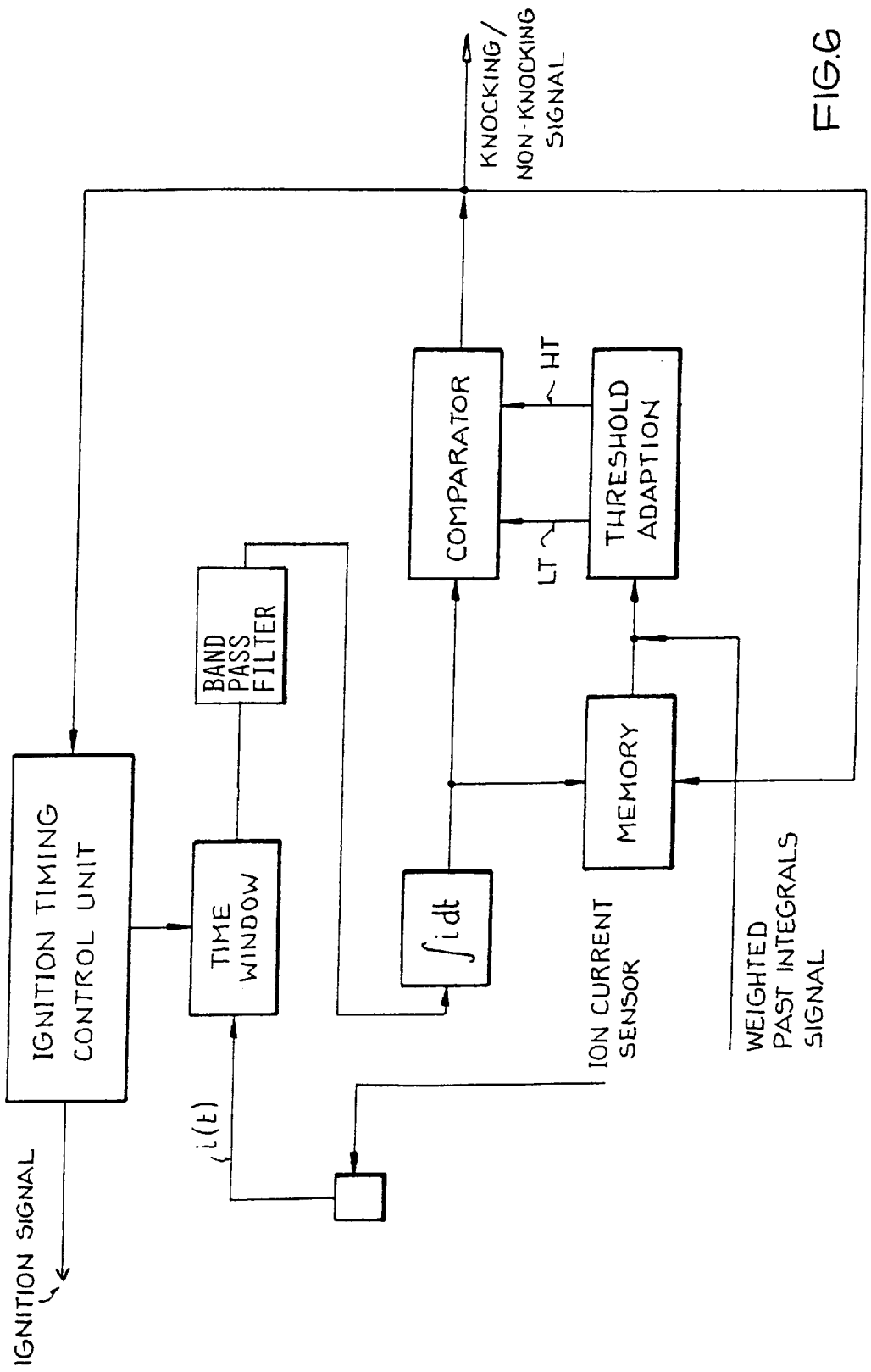
FIG. 6 is a schematic block diagram of a circuit suitable for carrying out the inventive method.

DETAILED DESCRIPTION OF PREFERRED EXAMPLE EMBODIMENTS AND OF THE BEST MODE OF THE INVENTION

FIGS. 1A, 1B, and 1C show the case of knock-free combustion. FIG. 1A shows the time progression of the ionic current signal i, whereby the spark dwell period of the ignition spark which begins at the ignition start time $t_0$ and ends at the ignition end time $t_1$ is not taken into account. Following the ignition spark dwell period from $t_0$ to $t_1$, the ionic current signal i exhibits a flame front signal region 1, which reaches a primary signal maximum and then falls off, and which is then followed by a secondary ionization maximum 1A at the peak of compression. The time window Tκ relevant for knocking recognition begins at time $t_2$ and ends at time $t_3$, whereby this time window spans the significant time during which any knocking phenomenon are expected to occur.

FIG. 1B shows the band-pass filtered ionic current signal that has been filtered to include only the frequencies characteristic of knocking. As can be seen especially in FIG. 1B, an oscillation having frequencies within the relevant frequency range arises only in the flame front signal region 1 in the case of knock-free combustion. Namely, since there is no knocking occurring in this combustion cycle, the band-pass filtered amplitude in the time window Tκ between the times $t_2$ and $t_3$ is substantially 0. Accordingly, the integral value $\int i \, dt$ of the band-pass filtered and time sampled ionic current signal i is thus 0, or at least smaller than the lower knocking threshold LT, as shown in FIG. 1C.

In comparison to FIGS. 1A, 1B and 1C, the next set of FIGS. 2A, 2B and 2C show the case of knocking combustion, wherein it is apparent that the ionic current signal i includes a variation or oscillation in the knocking signal region 2 within the time window Tκ. Thus, in FIG. 2A, the knocking is only apparent as a high frequency oscillation superimposed on the general ionic current signal in the region 2. It is possible to isolate and better recognize the knocking by band-pass filtering the signal in the relevant frequency range as shown in FIG. 2B. As a result, the integral value $\int i \, dt$ of the band-pass filtered and time sampled ionic current signal i thus increases during the time window Tκ from time $t_2$ to time $t_3$ to a value that exceeds the lower knocking threshold LT. However, the integral value of the signal caused by the knocking phenomenon does not exceed the higher knocking threshold HT, as shown in FIG. 2C. The particular selection, dimensioning, and updating of the lower and higher knocking threshold values dependent on the respective operating condition of the engine will be described below.

As a further comparison, FIGS. 3A, 3B, and 3C show a case of an atypical combustion phenomenon suffering a disturbance or an irregular combustion. Such atypical combustion conditions and resulting irregular ionic current signals can be observed particularly when double- or multiple-spark ignition is used for igniting the combustion in a combustion cycle. Moreover, an improper dimensioning or time-positioning of the time window Tκ can also lead to the occurrence of atypical or irregular ionic current signal components within the time window, because influences of the flame front signal region 1 may be encompassed within the time signal Tκ.

More particularly, the drop in the ionic current signal i that was observed after the primary maximum of the flame front signal region 1 during normal knock-free combustion as shown in FIG. 1A, and during knocking combustion as shown in FIG. 2A, is either partially or completely absent in the atypical combustion condition shown in FIG. 3A. Instead, the oscillations that began at the characteristic peak of the flame front region 1 continue into the time window T<sub>K</sub> in an atypical signal region 3 with a relatively high amplitude and with frequency components within the range that is also characteristic of knocking, as shown in FIG. 3A. As a result, these oscillations in the signal will pass through the band-pass filter with a high amplitude as shown in FIG. 3B, and will ultimately cause the integral value to reach an unusually high value, and especially a value exceeding the higher knocking threshold HT as shown in FIG. 3C.

This influence on the integral value, caused by the atypically extended oscillating flame front signal region 3 with a high amplitude allows this atypical condition to be detected and distinguished from knocking combustion. Namely, because this condition leads to an unusually rapid and high rise of the integral value $\int i\,dt$ within the time window $T_K$ as shown in FIG. 3C, the integral value ultimately reaches a level exceeding the higher knocking threshold HT, whereby the combustion condition can be recognized as atypical.

According to the prior art as described above, such an atypical combustion condition would be evaluated and indicated as a knocking combustion, since the integral value $\int i\,dt$ exceeds the lower knocking threshold LT as shown in FIG. 3C and the prior art does not provide for a further evaluation in connection with a second higher threshold. However, according to the invention, the use of a higher knocking threshold HT allows such an implausible interpretation to be avoided. Namely, the resulting integral value is recognized as being implausible because it exceeds the higher knocking threshold HT. Consequently, the combustion is defined as non-knocking, and the measurement and evaluation is repeated.

FIG. 4 schematically shows the adaptation or adjustment of the threshold values of the lower knocking threshold LT and the higher knocking threshold HT dependent on the respective operating condition of the internal combustion engine over the course of several combustion cycles. It should be noted that FIG. 4 shows the processes strongly compressed in time, whereby each "x" symbol denotes an integral value of $\int i\,dt$ determined during a single combustion cycle. More particularly, the values of the knocking thresholds HT and LT are adjusted or updated over time in the manner described above to follow the variation of plausible non-knocking integral values x. In this example, the higher knocking threshold HT is tied to the lower knocking threshold LT by a multiplicative factor f, so that any adjustment of the lower knocking threshold LT is amplified by the factor f and then effects a corresponding amplified adjustment in the higher knocking threshold HT. A corresponding increase of the two thresholds is especially noticeable directly following the time point $t_A$ at which the integral values x systematically increased. Similarly a decrease in the two knocking thresholds HT and LT is apparent following the time point $t_C$ at which the integral values x systematically decreased.

In combination with FIG. 4, FIG. 5 shows that a knocking condition is detected when the integral values x exceed the lower threshold LT but do not exceed the higher threshold HT, i.e. in the time range between $t_B$ and $t_C$ wherein the respective integral values x fall in the range LT<x=$\int i\,dt$<HT. The detected knocking condition is indicated during the time interval from $t_B$ to $t_c$ by releasing a knocking recognition signal 17, which in this example is simply a logical high signal, distinguished from the zero or low signal output representing a non-knocking signal 18.

It is also apparent in FIG. 4 that the previously existing threshold values are maintained during the period between $t_B$ and $t_C$ in which knocking combustion is recognized. It is preferred to "hold" or "freeze" the threshold values in this manner, because otherwise (under some circumstances), due to the influence of the higher knock-associated integral values feeding into the weighting function by which the threshold values are determined, the threshold values could drift out of the real range and to such a high level that atypical disturbances would erroneously be identified as knocking rather than as "implausible" values as described above. This faulty condition could especially arise after a large number of successive knock-influenced integral values occur.

A similar faulty upward shift of the threshold values could arise if the implausible integral values are allowed to influence the weighting function. For this reason, according to the invention, the implausible integral values are excluded from consideration in the weighting function for determining the new or updated threshold values. As shown in FIG. 4, the combustion cycles denoted as $t_x$ are those in which the integral value x exceeded the higher knocking threshold HT, whereby these respective integral values are recognized as being implausible and accordingly the lower knocking threshold LT and the higher knocking threshold HT are not adjusted or updated to follow these implausible integral values x. Instead, in each case at time $t_x$, the two knocking thresholds HT and LT are maintained at the respective previously existing levels.

Moreover, since these integral values x exceeding the higher threshold HT are recognized as implausible, they are not taken as indicating a knocking condition. Accordingly, the knocking recognition signal 17 is not triggered or affected by these implausible integral values, as shown in FIG. 5. Note that the knocking recognition signal 17 that was initiated at time $t_B$ continues regardless of the implausible integral value x that occurs between the times $t_B$ and $t_C$ as shown in FIG. 5. If, on the other hand, the knocking recognition signal 17 were to be intermittently discontinued (i.e. the combustion were to be intermittently defined as non-knocking) at this time point $t_x$ between times $t_B$ and $t_C$, this could lead to an ignition "miss" or spark failure in the next succeeding combustion cycle. Nonetheless, such a situation would not have any serious disadvantages in an engine equipped with an ignition timing control that carries out relatively small timing regulation adjustments in successive steps rather than a sharp adjustment carried out in a single step for example. That is also true when the previously determined combustion condition, i.e. knocking combustion in the present example, is maintained.

The various functions and method steps described herein can be carried out by any known circuit elements and/or software implementations for achieving such functions, as schematically exemplified in the block circuit diagram of FIG. 6.

As described in detail above and shown in FIG. 6, an ignition signal from an ignition timing control unit ignites a combustion in a combustion chamber. An ion current sensor senses an ionic current in the combustion chamber and provides a corresponding ionic current signal i(t) through a time window. The thus-sampled signal is filtered through a bandpass filter and then integrated in an integrator element ($\int i\,dt$). The integrated signal is provided to a memory and to a comparator. The memory provides a weighted past integrals signal to a threshold adaption element that correspondingly provides the low threshold (LT) and the high threshold (HT) to the comparator, which then compares the integrated signal to the thresholds so as to release a knocking signal or a non-knocking signal according to the invention. More specifically, for example, the time sampling and band-pass filtering of the ionic current signal can be carried out by any band-pass filters and sampling elements known to persons of ordinary skill in the art. The determination of the updated threshold values can be carried out by temporarily storing one or more prior integral values in a shift register or the like, and then reading out the desired plurality of prior integral values from the shift register positions, respectively multiplying each prior integral value by an associated weighting factor, and then arithmetically combining the resulting weighted prior integral values. The comparisons of the present integral value to the threshold values can be carried out using any known comparator element.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of detecting knocking combustion in an internal combustion engine having at least one combustion chamber operating in a succession of combustion cycles, comprising the following steps carried out for a respective present cycle of said combustion cycles:
    a) sensing an ionic current in said combustion chamber and providing an ionic current signal corresponding to said ionic current;
    b) processing said ionic current signal by sampling during a time window and filtering through a band-pass filter to provide a filtered sampled signal;
    c) integrating said filtered sampled signal to provide a present cycle integrated value;
    d) comparing said present cycle integrated value to a lower knocking threshold and to a higher knocking threshold that is higher than said lower knocking threshold;
    e) if said comparing determines that said present cycle integrated value does not exceed said lower knocking threshold, then providing a non-knocking signal indicating that knocking combustion has not been detected;
    f) if said comparing determines that said present cycle integrated value exceeds said lower knocking threshold and does not exceed said higher knocking threshold, then providing a knock recognition signal indicating that knocking combustion has been detected; and
    g) if said comparing determines that said present cycle integrated value exceeds said higher knocking threshold, then performing one of the following substeps:
        g1) providing said non-knocking signal, and
        g2) continuing to provide whichever one of said knock recognition signal and said non-knocking signal that was provided during a preceding one of said combustion cycles immediately preceding said present cycle.

2. The method according to claim 1, wherein said step g) comprises performing said substep g1).

3. The method according to claim 2, further comprising igniting a combustion in said combustion chamber at an ignition time point during said present cycle, and further comprising supplying said non-knocking signal to an ignition timing control unit that is adapted to adjust said ignition time point in a succession of partial adjustment steps over a plurality of said combustion cycles respectively responsively to receiving said non-knocking signal or said knock recognition signal.

4. The method according to claim 1, wherein said step g) comprises performing said substep g2).

5. The method according to claim 4, further comprising igniting a combustion in said combustion chamber at an ignition time point during said present cycle, and further comprising supplying said whichever signal to an ignition timing control unit that is adapted to adjust said ignition time point in a single total adjustment step from said present cycle to a next successive one of said combustion cycles respectively responsively to receiving said non-knocking signal or said knock recognition signal.

6. The method according to claim 1, further comprising igniting a combustion of a fuel-gas mixture in said combustion chamber using a single ignition spark during said present cycle.

7. The method according to claim 1, further comprising igniting a combustion of a fuel-gas mixture in said combustion chamber using a plurality of ignition sparks during said present cycle.

8. The method according to claim 1, further comprising varying at least said higher knocking threshold between said present cycle and a next successive one of said combustion cycles dependent on and responsive to at least one parameter characterizing a present operating condition of said engine.

9. The method according to claim 8, wherein said present operating condition of said engine comprises at least one of a rotational speed and a load of said engine.

10. The method according to claim 1, further comprising storing said present cycle integral value in a memory, and further comprising varying at least said higher knocking threshold between said present cycle and a next successive one of said combustion cycles dependent on at least one past integral value of said integral values that have been stored in said memory for said present cycle and prior ones of said combustion cycles prior to said present cycle.

11. The method according to claim 10, wherein said higher knocking threshold for each said combustion cycle is respectively determined dependent on a plurality of said past integral values that have been stored in said memory.

12. The method according to claim 11, wherein each respective one of said plural past integral values is respectively weighted inversely to the respective number of said combustion cycles occurring between said prior combustion cycle during which said respective past integral value was determined and said present combustion cycle, and then said weighted past integral values are combined to provide a combined weighted value, and said higher knocking threshold is determined dependent on said combined weighted value.

13. The method according to claim 10, further comprising suppressing said varying of said higher knocking threshold and instead maintaining said higher knocking threshold at the same threshold value for two successive ones of said combustion cycles if and as long as said knock recognition signal was provided in an earlier one of said two successive combustion cycles or said comparing in said step d) determined that said integrated value exceeded said higher knocking threshold in said earlier one of said two successive combustion cycles.

14. The method according to claim 13, wherein said varying is carried out dependent on only those of said integrated values that were determined not to have exceeded said lower knocking threshold.

15. The method according to claim 10, comprising carrying out said varying of both said higher knocking threshold and said lower knocking threshold.

16. The method according to claim 15, wherein said varying of said lower knocking threshold comprises directly calculating a new value of said lower knocking threshold from said at least one past integral value, and said varying of said higher knocking threshold comprises multiplying said new value of said lower knocking threshold by a factor greater than 1.

* * * * *